United States Patent
Balthazar et al.

[11] 3,780,555
[45] Dec. 25, 1973

[54] METHOD OF MAKING A PIPE WITH REFINED GRAIN STRUCTURE

[75] Inventors: Real J. Balthazar, Marina Del Rey; Richard A. Halberg, Manhattan Beach, both of Calif.

[73] Assignee: Sargent Industries, Inc., Los Angeles, Calif.

[22] Filed: Apr. 10, 1972

[21] Appl. No.: 242,708

[52] U.S. Cl.................. 72/69, 29/527.5, 29/527.7, 72/370
[51] Int. Cl........................ B21b 27/06, B21b 17/02
[58] Field of Search.......................... 72/84, 69, 370; 29/527.1, 527.5, 527.7; 164/76

[56] References Cited
UNITED STATES PATENTS

| | | | |
|---|---|---|---|
| 3,097,620 | 7/1963 | Peters | 72/84 |
| 3,314,143 | 4/1967 | McDonald et al. | 29/527.7 |
| 1,607,475 | 11/1926 | Otto | 29/527.7 |
| 2,273,931 | 2/1942 | Byrnes | 72/84 |
| 2,581,384 | 6/1971 | Petersen et al. | 29/527.7 |

Primary Examiner—Richard J. Herbst
Assistant Examiner—D. C. Reiley, III
Attorney—Gordon L. Peterson et al.

[57] ABSTRACT

A method of making a pipe comprising providing a pipe preform having a wall with relatively large columnar grains, refining the grain of the pipe preform by cold working and annealing, and cold working the wall subsequent to refining the grain to substantially axially elongate the pipe preform.

6 Claims, 7 Drawing Figures

Fig. 1
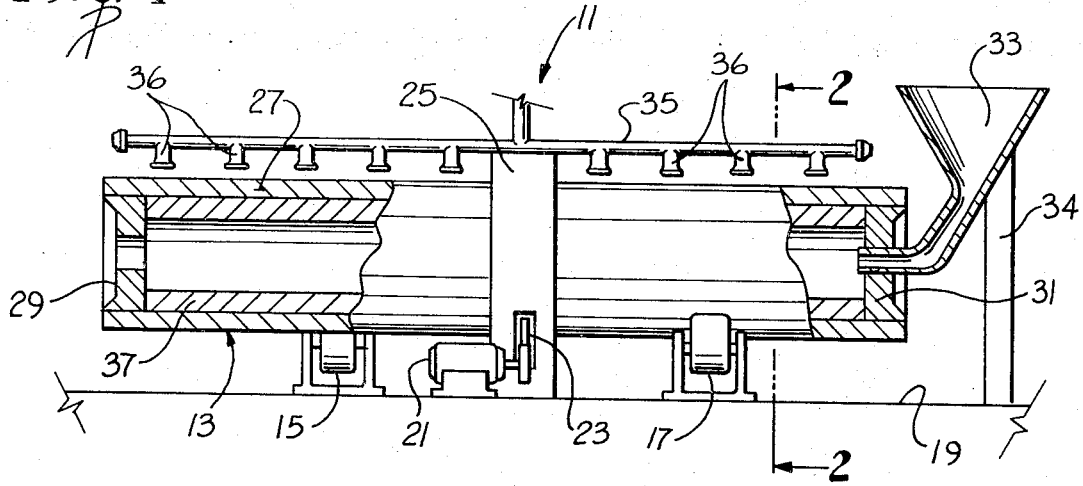
Fig. 2
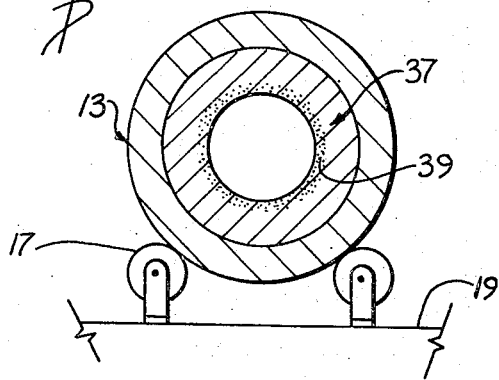
Fig. 3
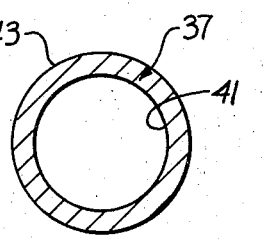
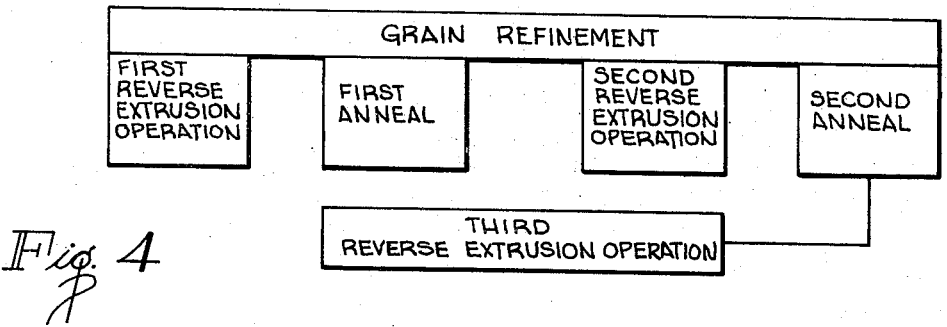
Fig. 4

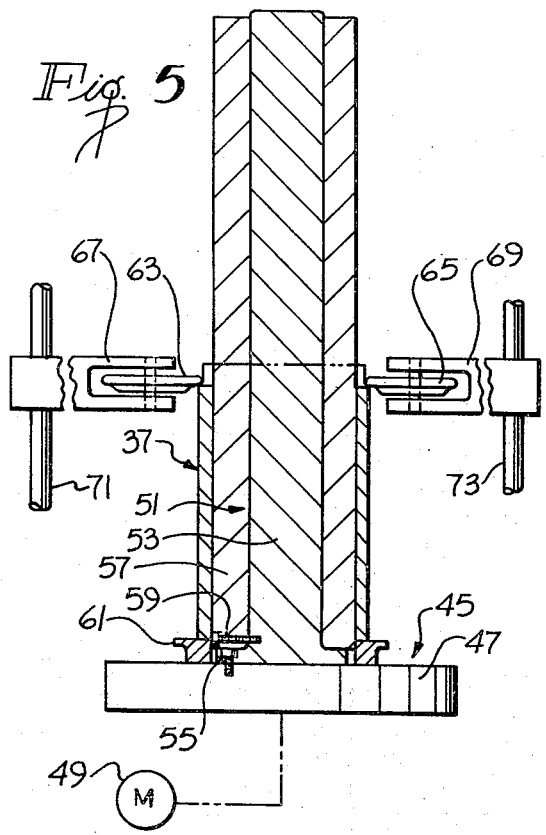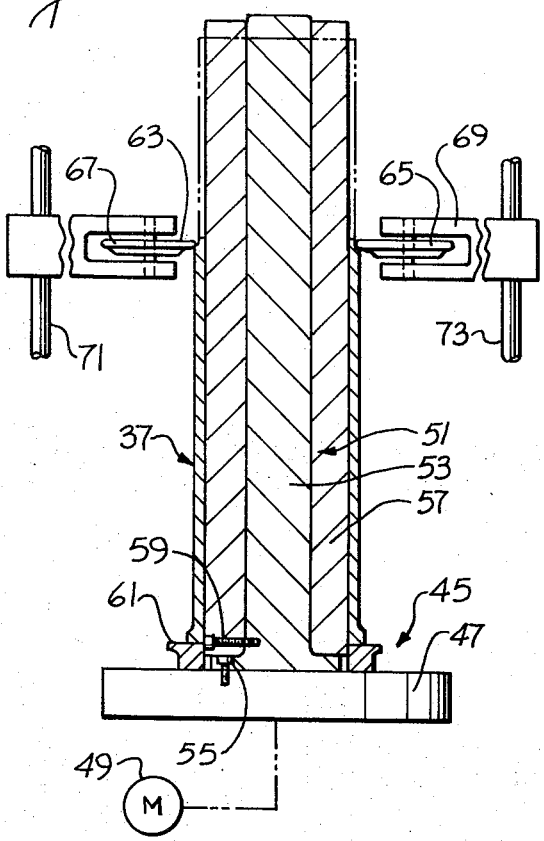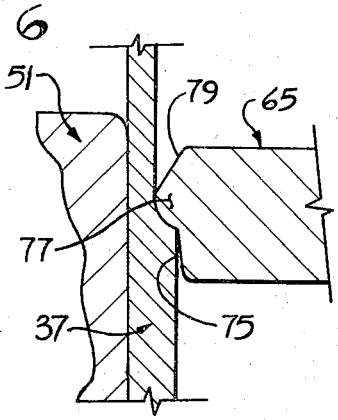

METHOD OF MAKING A PIPE WITH REFINED GRAIN STRUCTURE

BACKGROUND OF THE INVENTION

Many applications for pipe require that the pipe be seamless, have a refined grain structure, and a minimum of internal voids. It is difficult to economically fulfill these requirements, and this is particularly true when the pipe must have a thin wall and be of relatively large diameter. One example of an application having stringent piping requirements is the pipe used for transferring liquid sodium or pressurized water in nuclear power plants.

One process for providing a high quality seamless pipe of this type is disclosed in common assignee's copending application Ser. No. 177,260, entitled "Method of Making a Pipe," filed Sept. 2, 1971 and naming Richard A. Halberg and Dennis B. Spencer as joint inventors. The present invention is directed to certain improvements to the invention described in this copending application.

The copending application describes a method of making pipe which generally includes providing a tubular pipe preform and then subjecting the preform to a reverse extrusion operation to thin the wall of the pipe and to lengthen the pipe. The pipe preform is formed by a centrifugal casting operation. While this process is very satisfactory, for optimum results, it should be carried out so that the centrifugal casting operation produces a casting or pipe preform which has a relatively fine grain structure. Unfortunately, in the typical centrifugal casting operation, the fineness of the grain is not readily predictable within close tolerances. If the grain is not sufficiently fine, the inner surface of the pipe will be roughened and the preform will contain voids which are undesirable for sophisticated piping requirements. As the fineness of the grain of the cast preform is not readily predictable, the quality of the pipe produced therefrom tends to vary.

SUMMARY OF THE INVENTION

The present invention is based, in part, upon the recognition that the fineness of the grain of the centrifugally cast preform is not readily predictable within close tolerances and that the presence of large columnar grains in the preform can result in internal voids and a roughened inner surface on the ultimately formed pipe. The present invention provides a pipe making process including a grain refining technique which permits the use of preforms, including centrifugally cast pipe preforms, which have large columnar grains. After the grain structure is refined the preform is subjected to a reverse extrusion operation which materially thins and elongates the preform to form the pipe. This process repeatedly produces a high quality pipe having physical properties very similar to a wrought pipe.

The grain refining steps of the present invention include cold working and annealing the preform. Although the cold working operation may be carried out in various ways such as mechanical sizing, explosive forming, etc., reverse extrusion is preferred because, among other things, it is the most economical. The cold working operation should work the full thickness of the preform wall, for if it does not, recrystallization does not occur throughout the entire wall and cracks tend to develop. In the cold working operation, the grains are stretched axially. The purpose of the cold working in the refining operation is to provide activation energy for the formation of new, smaller grains. Cold working is the beginning of grain refinement.

The first cold working operation for grain refinement purposes should result in a relatively small wall thickness reduction with the specific amount of wall thinning depending upon various factors including grain size. The cast pipe preform is typically annealed prior to beginning of the grain refinement operation and, accordingly, the material thereof is relatively soft. If the cold working operation results in too large a wall thickness reduction, the inner surface tends to become wavy. On the other hand, the cold working must be sufficient to work the full thickness of the pipe preform. In addition, if the cold working is insufficient, ring rolling occurs in which the inner periphery of the preform moves away from the mandrel which is inserted therein for the cold working operation. The optimum amount of cold working is the maximum amount of cold working which the pipe preform can endure without causing the problem noted above.

The limits on wall thinning as a result of the cold working operation will vary depending upon various factors including grain size, material, and the physical properties of the pipe preform. By way of example, a 20 percent wall thickness reduction can be obtained in the first cold working operation when the cast pipe preform has relatively large columnar grains and is received in an annealed condition. On the other hand, to avoid ring rolling and to assure that the full wall thickness of the pipe preform is worked, a 5 percent reduction in wall thickness is considered minimum.

The first cold working operation can often be advantageously carried out in two separate reverse extrusion passes. By using two passes, the surface finish is improved and the tendency of the material to build up beneath the reverse extrusion tooling or rollers is eliminated. If the first pass causes too great a thickness reduction, the inner periphery of the preform tends to become wavy, and then when the second pass is taken the grains fold over. Generally, cold working hardens the surfaces of the preform and, with subsequent annealing, the structure becomes more uniform from a chemical standpoint.

After the pipe preform is cold worked as described above, it is annealed. The result of the annealing step is nucleation of new grains from the cold worked structure, i.e., the formation of new, small grains begins. The annealing operation is carried out above the recrystallization temperature. For example, a temperature of about 1,900° F. may be used when the preform is constructed of 304H stainless steel. If the annealing temperature is too high, grain growth becomes too rapid. The pipe preform is annealed for a period equal to the time necessary for recrystallization without much grain growth.

For some applications, a grain refinement technique consisting of a single cold working operation followed by a single annealing operation may be sufficient. However, to improve the mechanical properties of the preform, the grain refinement technique may include multiple cold working operations with each of the cold working operations being followed by an annealing operation. The guidelines for carrying out subsequent cold working and annealing operations for grain refinement purposes may be substantially as described hereinabove for the first cold working operation and the first annealing operation, respectively. Generally, the physical properties continue to improve as the number of cold working and annealing operations is increased; however, the rate of improvement in the properties tends to flatten out after two cold working operations and two annealing operations. Accordingly, for sophisticated piping requirements, two of these operations are considered as an optimum balance between the cost of grain refining and the properties obtained. More generally, the refining operation is terminated when the grains of the preform achieve the desired size.

After the grain of the pipe preform is refined to the desired size, the pipe preform is cold worked preferably through a reverse extrusion operation to further thin and elongate the preform and to convert the preform into a pipe adapted for sophisticated piping requirements. This reverse extrusion operation may occur in one or more passes depending upon the amount of thinning and elongation desired. Generally, each of these passes will thin the wall of the pipe preform by a percentage which is substantially greater than the percentage of thinning obtained from one reverse extrusion pass which is carried out for grain refinement purposes. By way of example, each of the passes of this reverse extrusion operation may thin the wall of the preform by 25 to 30 percent thus achieving a substantial reduction in wall thickness and substantial elongation. Because of the grain refinement, heavy passes can be taken, and nevertheless, the resulting pipe is of high quality and has the mechanical properties of a wrought structure.

The process of this invention is useful for many metals but is particularly adapted for use with metals having large columnar grains. For example, 304H cast stainless can be used as the material of the pipe preform. It has also been found that carbon content of the metal of the pipe preform has an effect on the results obtained with the present invention. Specifically, metal having a carbon content of no greanter than 0.07 percent by weight is preferred because if the carbon content exceeds this amount, the preform tends to crack after the first annealing operation and during the second cold working operation of the grain refinement process.

The invention can best be understood by reference to the following description taken in connection with the accompanying illustrative drawings.

BRIEF DESCRIPTION OF THE DRAWINGS

FIG. 1 is a schematic front elevational view of a centrifugal casting apparatus in which the pipe preform may be centrifugally cast. Portions of the centrifugal casting apparatus have been broken away to show the cast preform at the end of the casting operation as well as some of the internal structure of the apparatus.

FIG. 2 is a sectional view taken generally along line 2—2 of FIG. 1.

FIG. 3 is a sectional view of the centrifugally cast pipe preform after removal of the impurities from the interior surface and machining of the exterior surface thereof.

FIG. 4 is a block diagram showing a preferred process for converting the centrifugally cast pipe preform into a high quality pipe.

FIG. 5 is a front elevational view partially in section of a shear spinning machine useable to carry out the reverse extrusion operation with the rollers of the machine in position for a first pass over the cast preform for grain refinement purposes.

FIG. 6 is an enlarged fragmentary sectional view illustrating the cooperation between one of the rollers and the mandrel of the shear spinning machine when the machine is carrying out a reverse extrusion operation.

FIG. 7 is a front elevational view partially in sections similar to FIG. 5 with the rollers in position for a first pass along the pipe preform subsequent to the grain refinement operation.

DESCRIPTION OF THE PREFERRED EMBODIMENT

The first step of the method of this invention is to provide a pipe preform such as the pipe preform 37 shown in FIG. 3. The pipe preform 37 is then subjected to the operations shown diagrammatically in FIG. 4.

Although the pipe preform 37 could be constructed in accordance with different methods, in the specific embodiment illustrated it is a centrifugal casting formed in a centrifugal casting apparatus 11 (FIG. 1). The illustrated construction of the centrifugal casting apparatus 11 is merely illustrative of the kind of centrifugal casting apparatus which may be employed and the description thereof should not be taken as limiting.

The apparatus 11 generally includes a casting die 13 mounted for rotation about a generally horizontal axis by bearings 15 and 17 which are in turn suitably mounted on a supporting surface 19. The casting die 13 is spun about its axis by a drive motor 21 suitably connected by a drive train 23 to the casting die. The drive train 23 may include a plurality of drive rollers within a housing 25.

The casting die 13 includes a cylindrical tube 27, the opposite ends of which are closed by centrally apertured end caps 29 and 31. A standpipe 33 which can be supported in any suitable manner as by a support surface 34 is adapted to receive molten metal and conduct the same through the aperture in the end cap 31 into the interior of the casting die 13. A preheater 35 in the form of a gas burner having several nozzles 36 is provided to preheat the casting die 13.

In operating the centrifugal casting apparatus 11, the preheater 35 is first used to preheat the casting die 13 to the desired temperature. Next, the motor 21 is energized to spin the casting die 23. Molten metal is poured into the upper end of the standpipe 33, and from there it flows into the interior of the casting die 13.

The centrifugal force created by the rapid rotation of the casting die 13 hurls the molten metal outwardly against the inner surface thereof. As the molten metal cools, it solidifies progressively from the outside to the inside to form a cast tubular pipe preform 37 having inner and outer peripheries which are generally concentric cylinders. The casting die 13 is spun until the molten metal has completely solidified.

The molten metal contains impurities which are of lesser density than the metal being cast. This means that the impurities will collect in an inner annular region 39 (FIG. 2) of the preform 37. The impurities in FIG. 2 are designated by the dots along the inner peripheral region 39.

Because the impurities are collected in the inner annular region 39, they can be simply removed in a boring operation thereby leaving the cast pipe preform 37 with an inner cylindrical surface 41 (FIG. 3). In addition, the cast pipe preform 37 has an outer cylindrical surface 43 which is machined to improve the surface finish and to make the outer surface concentric with the inner surface 41.

Preferably the casting operation is carried out so that the pipe preform 37 has relatively large columnar grains. The preform 37 is also annealed and has a carbon content of no more than about 0.07 percent by weight. If the pipe preform 37 with its relatively large columnar grains were operated upon directly in an effort to convert the latter into a longer thinner walled pipe, the resulting pipe would have more voids and a rougher internal surface than may be desirable for high quality pipe.

According to the present invention, the relatively large columnar grains of the cast pipe preform 37 are refined so as to make smaller grains. As shown diagrammatically in FIG. 4, the grain refinement process of this invention includes alternate reverse extrusion and annealing operations. In the illustrated embodiment of the invention, the first extrusion operation as well as subsequent extrusion operations can be carried out by a shear spinning machine 45 (FIG. 5); however, other equipment could be utilized to carry out this function. The shear spinning machine 45 is conventional and for that reason is not described in detail herein.

The shear spinning machine 45 includes a rotor 47 suitably mounted for rotation about a vertical rotational axis and a motor 49 for driving the rotor. A cylindrical mandrel 51 is mounted on the rotor 47 with the axis of the mandrel coinciding with the axis of rotation of the rotor. Although the construction of the mandrel could take different forms, in the embodiment illustrated the mandrel 51 includes a core 53 mounted on the rotor 47 by a plurality of bolts 55 and a sleeve 57 which telescopes over the core and which is attached thereto by a plurality of bolts 59. A stripper ring 61 rests on the upper surface of the rotor 47 and circumscribes the mandrel near the base thereof. As shown, the cast pipe preform 37 rests on the upper surface of the stripper ring 61 with the mandrel 51 projecting axially above the cast preform.

A pair of forming rings or rollers 63 and 65 are mounted for rotation by a pair of headers 67 and 69, respectively. The forming rings 63 and 65 are rotatable about generally vertical axes. The headers 67 and 69 are mounted for movement axially and radially of the mandrel 51 by supporting structures 71 and 73, respectively, with such movements being suitably controlled by a control mechanism (not shown). Although two forming rings 63 and 65 are shown, any suitable number of these rings can be employed.

The forming rings 63 and 65 are identical and the periphery of the forming ring 65 is shown on a relatively large scale in FIG. 6. The periphery of the forming ring 65 includes a cylindrical section 75 and a radially projecting circumferentially extending rib 77 which is arcuate in side elevation. The rib 77 is formed, in part, by a frusto conical surface 79 which tapers away from the mandrel 51 as it extends upwardly.

In carrying out the reverse extrusion operation, the cast pipe preform 37 which has been formed such as by the casting apparatus 11 is placed over the mandrel 51 with the lower end of the pipe resting on the stripper ring 61. The cast preform 37 forms a sliding fit with the mandrel 51.

The motor 49 is started to spin the rotor 47, the mandrel 51 and the preform 37. The headers 67 and 69 are advanced toward the upper end of the preform 37 until the ribs 77 of the forming rings 63 and 65 contact the upper end of the preform 37 as shown in FIG. 4.

As best seen in FIG. 6, the rib 77 of the forming ring 65 engages the wall of the preform 37. As the pipe preform 37 is rotating, the forming rings 63 and 65 are rotated by the pipe preform. The wall of the pipe preform 37 is radially compressed between the mandrel 51 and the forming ring 65 with sufficient pressure being applied to cause plastic flow of the metal of the pipe preform. The plastic flow of the metal results in reducing the thickness of the wall of the preform 37 and in lengthening of the wall. The thickness reduction of the wall of the preform 37 shown in FIG. 6 is not to scale and has been purposely exaggerated for purposes of clarity. The metal flows upwardly rather than downwardly because there is much less resistance to upward flow than downward flow. The reason is that the flow of metal is not confined or restricted in the upward direction whereas in order to flow downwardly it would be necessary to form a radial outward bulge in the wall of the preform 37 beneath the forming ring 65. The surface 75 (FIG. 6) prevents such outward bulge from occurring. This is a reverse extrusion process in that the flow of metal is in a direction opposite to the direction of axial movement of the forming rings 63 and 65.

The action of the forming ring 63 is identical to that of the forming ring 65. However, the forming rings 63 and 65 are preferably arranged radially and axially relative to the precast preform 37 so that each of them can perform a reverse extrusion operation with the mandrel. For example, the forming ring 65 may thin and elongate the wall of the pipe preform 37 a predetermined amount and the forming ring 65 may further thin and elongate the portion of the wall of the pipe preform which has already been thinned and lengthened by the forming ring 65. To do this, the axial movement of the forming ring 63 must lag slightly behind the forming ring 65, i.e., the forming ring 63 must follow the forming ring 65. In addition, the rings 63 and 65 must be appropriately positioned radially of the mandrel.

As used herein, the advance of both of the forming rings 63 and 65 as described hereinabove along the preform 37 for substantially the full length thereof is considered to be one pass. To begin the first reverse extrusion operation (FIG. 4) the forming rings 63 and 65 make a light or fine pass over the pipe preform 37. This cold works the pipe preform 37 particularly along the outer surface 43 and somewhat less along the inner surface 41. By way of example, the first pass with the forming rings 63 and 65 may cause approximately a 10 percent reduction in thickness of the wall of the pipe preform, with each of the forming rings causing about a 5 percent reduction, and some elongation thereof as illustrated by the phantom lines in FIG. 5.

Although the first extrusion operation results in thinning of the wall of the preform 37 and consequent elongation thereof, this is not the primary purpose of the first extrusion operation. Rather, the purpose of the first reverse extrusion operation is to cold work the preform 37 in such a manner as to provide activation energy for the formation of new, smaller grains.

Preferably, a second pass of the forming rings 63 and 65 is made in the same manner as the first pass. By way of example, the second pass may also reduce the thickness of the wall of the preform 37 by about 10 percent with each of the two forming rings 63 and 65 causing a 5 percent reduction. Thus, the result of the first reverse extrusion operation is a wall thickness reduction of 20 percent. Causing such a reduction in two passes in lieu of one is preferred because a single pass which causes a 20 percent wall thickness reduction may cause the extruded material to build up beneath the forming rings 63 and 65 and this has adverse effects on the surface finish.

Following the first reverse extrusion operation, the pipe preform 37 is subjected to a first annealing operation. For a preform constructed of 304H stainless steel, an annealing temperature of 1,900° F. plus or minus 25° has been found satisfactory with the annealing period being about one hour. Of course, this is merely an example of a suitable annealing process for this particular kind of material.

For some applications, the pipe preform 37 is suitable following the first annealing operation for substantial cold working which will convert the preform into a pipe. However, it may be desirable to further refine the grain with a second reverse extrusion operation followed by a second annealing operation as indicated in FIG. 4. The second reverse extrusion operation and the second annealing operation are identical to the first reverse extrusion operation and the first annealing operation, respectively. Additional reverse extrusion operations and annealing operations can also be performed for the purpose of grain refinement. However, under ordinary circumstances, after the second annealing operation, the grain structure of pipe preform will be refined sufficiently to allow the preform to be subjected to heavy passes of the forming rings 63 and 65 to thereby convert the preform into a high quality pipe.

FIG. 7 shows a pipe preform 37 at the beginning of the third reverse extrusion operation. With the grain of the preform 37 suitably refined, the preform can now be substantially cold worked in the third reverse extrusion operation without the danger of producing internal voids or surface roughness. Accordingly, in the third reverse extrusion operation, the forming rings 63 and 65 take a relatively heavy pass along the pipe preform 37 with the result that the thickness of the wall of the preform may be reduced from 25 to 30 percent with consequent substantial elongation of the preform as shown by the phantom lines in FIG. 7. The third reverse extrusion operation may also include one or more additional relatively heavy passes of the forming rings 63 and 65 with the thickness of the wall of the preform being reduced approximately 25 to 30 percent, for example, in each of the passes. Two passes of the forming rings 63 and 65 have been found particularly useful.

The process described herein is not restricted to any particular metal. However, it has proven to be a very desirable process when used with austenitic stainless steels such as 304 or 316 stainless. The axial feed rate of the forming rings 63 and 65, and the surface speed of the forming rings on the pipe 37 can be varied by those who are skilled in the art to suit particular operating requirements.

Although exemplary embodiments of the invention have been shown and described, many changes, modifications and substitutions may be made by one skilled in the art without necessarily departing from the spirit and scope of this invention.

We claim:

1. A method of making a pipe comprising:
   providing a centrifugal stainless steel casting of generally tubular configuration having a wall with a relatively large columnar grain structure and with said wall defining a passage in said casting, said wall having a carbon content of no more than about 0.07 percent by weight;
   inserting a mandrel into the passage of the casting;
   providing tooling;
   radially compressing the wall of said casting between the mandrel and the tooling while advancing the tooling axially of the casting and while relatively rotating the casting and the tooling to thereby subject the casting to a first reverse extrusion operation which thins and axially elongates said wall;
   annealing said casting subsequent to said first reverse extrusion operation with the annealing and the first reverse extrusion operation refining the grain structure of the casting; and
   subjecting the casting into a second reverse extrusion operation subsequent to said step of annealing which thins and elongates said wall a greater percent than said first reverse extrusion operation whereby said casting is converted into the pipe.

2. A method as defined in claim 1 wherein the first reverse extrusion operation is carried out with the axis of the mandrel generally vertical.

3. A method as defined in claim 1 wherein said reverse extrusion operation includes at least one pass of said tooling over the wall with said one pass reducing the thickness of said wall an amount no less than about 5%.

4. A method as defined in claim 1 wherein said step of radially compressing includes thinning the wall from about 5 to about 20 percent.

5. A method as defined in claim 1 wherein said first reverse extrusion operation includes advancing the tooling axially of the casting a plurality of times with each of said advances resulting in reverse extrusion of the wall of the casting.

6. A method as defined in claim 1 including subjecting the casting to a third reverse extrusion operation which thins and elongates the wall a lesser percent than said second reverse extrusion operation, annealing the casting after said third reverse extrusion operation, said last mentioned step of annealing and said third reverse extrusion operation being carried out after said first mentioned step of annealing and prior to said second reverse extrusion operation and causing further refinement of the grain of the casting.

* * * * *